United States Patent [19]

Wade et al.

[11] Patent Number: 5,441,221
[45] Date of Patent: Aug. 15, 1995

[54] HEAVY-LIFT VEHICLE-LAUNCHED SPACE STATION METHOD AND APPARATUS

[75] Inventors: Donald C. Wade, Friendswood; Horacio M. De La Fuente, Friendswood; Reginald B. Berka, Houston; Steven L. Rickman, League City; Edgar O. Castro; Kornel Nagy, both of Houston; Clarence J. Wesselski, Alvin; Timothy E. Pelischek, Santa Fe; John A. Schliesing, Houston, all of Tex.

[73] Assignee: The United States of America as represented by the Administrator of the National Aeronautics and Space Administration, Washington, D.C.

[21] Appl. No.: 161,038

[22] Filed: Dec. 3, 1993

[51] Int. Cl.⁶ .............. B64G 1/60; B64G 1/22; B64G 1/44
[52] U.S. Cl. .................. 244/159; 244/172; 244/173
[58] Field of Search ............ 244/158, 159, 172, 173

[56] References Cited

U.S. PATENT DOCUMENTS

| | | | |
|---|---|---|---|
| 3,169,725 | 2/1965 | Berglund | 244/1 |
| 3,210,026 | 10/1965 | Frisch | 244/1 |
| 3,300,162 | 1/1967 | Maynard et al. | 244/1 |
| 3,753,536 | 8/1973 | White | 244/2 |
| 4,384,692 | 5/1983 | Preukschat | 244/161 |
| 4,480,415 | 11/1984 | Truss | 244/159 |
| 4,562,979 | 1/1986 | Taylor | 244/159 |
| 4,587,777 | 5/1986 | Vasquez et al. | 244/173 |
| 4,792,108 | 12/1988 | Bull | 244/159 |
| 4,834,325 | 5/1989 | Faget | 244/158 R |
| 4,872,625 | 10/1989 | Filley | 244/159 |
| 5,143,327 | 9/1992 | Martin | 244/158 R |
| 5,184,789 | 2/1993 | Aldrin | 244/159 |
| 5,242,135 | 9/1993 | Scott | 244/158 R |

OTHER PUBLICATIONS

Flight International "Spaceflight" 16 Mar. 1967 pp. 420–421.

Primary Examiner—Michael S. Huppert
Assistant Examiner—Virna Lissi Mojica
Attorney, Agent, or Firm—Hardie R. Barr; Edward K. Fein; Guy M. Miller

[57] ABSTRACT

Methods and apparatus are provided for a single heavy-lift launch to place a complete, operational space station on-orbit. A payload including the space station takes the place of a Shuttle Orbiter using the launch vehicle of the Shuttle Orbiter. The payload includes a forward shroud, a core module, a propulsion module, and a transition module between the core module and the propulsion module. The essential subsystems are pre-integrated and verified on Earth. The core module provides means for attaching international modules with minimum impact to the overall design. The space station includes six control moment gyros for selectably operating in either LVLH (local-vertical local-horizontal) or SI (solar inertial) flight modes.

20 Claims, 17 Drawing Sheets

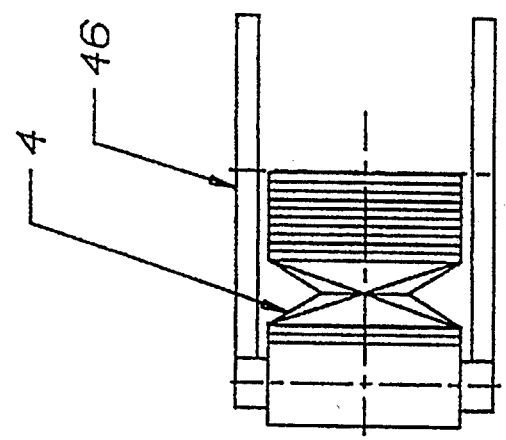
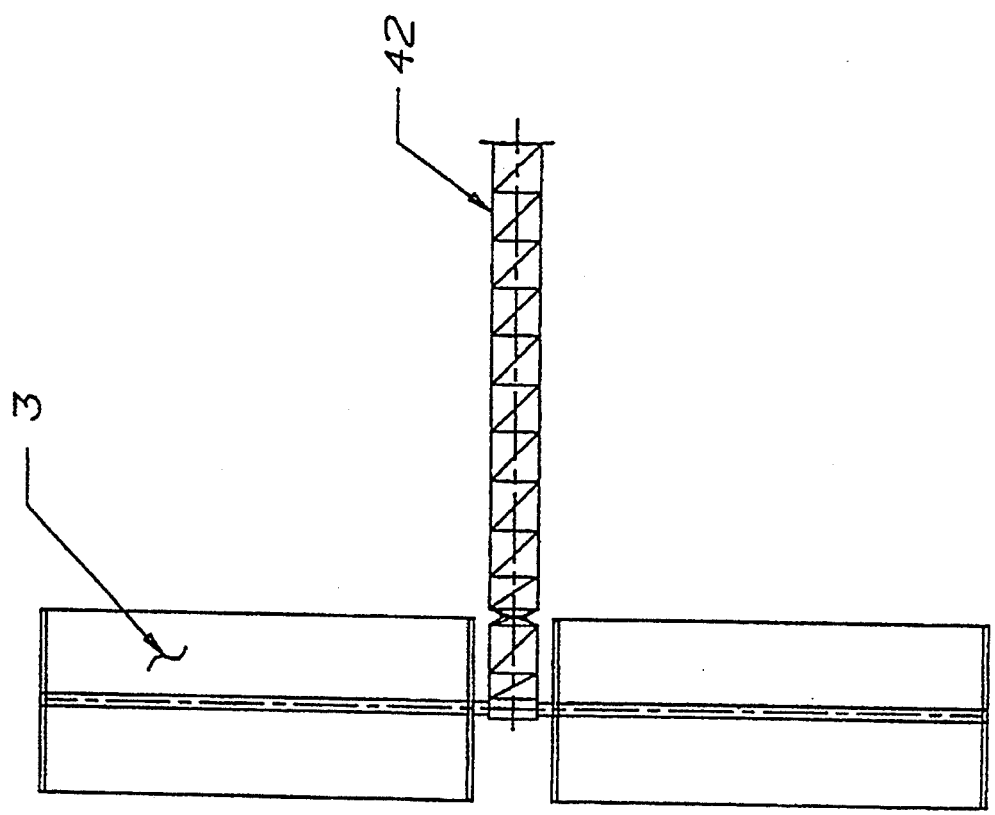
FIG. 9B
FIG. 9A

HEAVY-LIFT VEHICLE-LAUNCHED SPACE STATION METHOD AND APPARATUS

ORIGIN OF THE INVENTION

The invention described herein was made by employees of the United States Government and may be manufactured and used by or for the Government of the United States of America for governmental purposes without the payment of any royalties thereon or therefor.

TECHNICAL FIELD

The present invention generally relates to space station construction and launching methods. More specifically, the present invention relates to a complete space station configuration that is adapted to be launched in its entirety using a Shuttle derived launch vehicle.

BACKGROUND ART

It is desirable to have a permanent manned presence in space for a number of reasons, including having a national laboratory in space and a continuously operational space observatory. While prior art space stations normally provide the desired permanent manned presence, they often require extensive on-orbit construction and numerous launches which restrict their general cost effectiveness. For instance, several prior art stations require many launches to provide a complete, operational space station. Furthermore, the assembly of the various modules forming prior art space stations may require significant EVA (extra vehicular activity) construction. If for some reason a flight must be aborted or is not launched within a certain time period, prior art space stations may have construction timing problems. Prior art space station designs do not always facilitate the addition of supplemental structure, such as pressurized living and laboratory areas or electrical power production, which may be required at a future time.

Somewhat older prior art single-launch space station designs may not be adaptable for fully efficient use with presently available heavy-lift launch vehicles. Recently developed single-launch space station designs are substantially limited in pressurized living volume so that the entire space station may fit into the cargo bay of the Shuttle Orbiter. Such designs may also require significant EVA construction. The cargo bay of the Shuttle Orbiter is generally limited to a medium size payload weighing approximately 35,000 pounds. This compares to the heavy lifting power of the Shuttle Orbiter launch vehicle which may lift a comparatively heavy payload in the general range of about 180,000 pounds.

Examples of prior art space stations and heavy-launch vehicles include U.S. Pat. No. 5,143,327 to James A. Martin which discloses a heavy-launch vehicle for placing a payload into Earth orbit having a preferred payload entry module adapted to be docked to a space station.

U.S. Pat. No. 5,184,789 to Buzz Aldrin discloses a space station facility having a plurality of elongated members which form a cuboctahedral-shaped structure surrounding a central pressurized command module. The space station facility may orbit as a space station, or be used as part of a larger space station.

U.S. Pat. No. 4,792,108 to Stephen M. Bull discloses a space station adapted to be launched in its entirety in a single voyage as cargo in the hold of the Shuttle Orbiter. It is deployed in space and erected to form a structure with a number of modules held in fixed relation to each other.

U.S. Pat. No. 4,872,625 to Charles C. Filley discloses a universal module assembly including a pressure vessel having cylindrical side walls and curved end surfaces. A rigid external supporting framework is attached to the exterior of and surrounds the pressure vessel. The framework includes a main body portion disposed around cylindrical side walls and having end portions covering the curved end surfaces of the pressure vessel.

U.S. Pat. No. 3,300,162 to O. E. Maynard et al. discloses three elongate rigid cylindrical modules, each of which, when the station is fully erected, extends radially outwardly from a central hub structure that includes hangar and docking facilities for spacecraft.

U.S. Pat. No. 3,210,026 to Erling Frisch discloses an expandable space platform Comprising a pair of outer cabins joined together by a telescopic arrangement and preferably having a main central cabin incorporated in the structure between the outer cabins. The outer cabins can include living quarters with suitable conditions for crew and storage, operating machinery, test equipment, and the like.

Consequently, there remains the need for an improved space station requiring little EVA (extra-vehicular activity) for assembly, that offers a complete and comparatively large pressurized living and working volume with integrated essential subassemblies, and that is suitable for a single launch at reduced levels of capital investment.

STATEMENT OF THE INVENTION

The present invention provides a method and apparatus for launching a complete space station into orbit. The method of the present invention involves use of a Shuttle derived launch vehicle, and substitutes a payload containing the space station in place of the Shuttle Orbiter.

More specifically, the substantially conventional Shuttle derived heavy-lift vehicle is provided with a central fuel tank and two booster rockets laterally disposed with respect to the central fuel tank. As part of the payload package for the Shuttle derived launch vehicle, a space station core module is included which has an unpressurized forward volume, an unpressurized aft volume, and a pressurized middle volume. An ejectable aerodynamic fairing is provided as a forward shroud for the unpressurized forward volume. An ejectable propulsion module, in addition to the two booster rockets, develops a lifting force for both the payload and the Shuttle derived launch vehicle. An ejectable transition module mounts between the propulsion module and the space station core module.

The propulsion module disposed adjacent the unpressurized aft volume and the propulsion module has a substantially non-cylindrical outer frame. The propulsion module is essentially the same propulsion module as used with the Shuttle Orbiter. The transition section includes a thrust structure means for transferring the launch load developed by the propulsion module from the substantially non-cylindrical outer frame of propulsion module to the substantially cylindrical outer frame of the space station core module.

An object of the present invention is to provide an improved heavy-lifting method for launching a space station.

A further object of the present invention is to provide a payload which includes a complete space station for launch using a Shuttle derived launch vehicle.

A feature of the present invention is a payload disposed laterally to the Shuttle derived launch vehicle in place of the Shuttle Orbiter.

Another feature of the present invention is a transition section including means to transfer lift load from a propulsion module.

A significant advantage of the present invention is a lower cost to place a complete space station in orbit using a single launch of a readily available heavy lift vehicle.

Another advantage of the present invention is avoidance of the relative high cost and high risk of EVA (extra vehicular activity) to assemble a space station on-orbit.

Other objects, features and intended advantages of the present invention will be readily apparent by the references to the following detailed description in connection with the accompanying drawings and claims.

BRIEF DESCRIPTION OF THE DRAWINGS

FIG. 9A is an elevational view of a deployed square truss and solar array;

FIG. 9B is an elevational view of the folded square truss and solar array shown in FIG. 9A;

While the invention will be described in connection with the presently preferred embodiments, it will be understood that it is not intended to limit the invention to these embodiments. On the contrary, it is intended to cover all alternatives, modifications, and equivalents as may be included in the spirit of the invention.

DESCRIPTION OF THE PREFERRED EMBODIMENTS

The present invention describes a method and apparatus for launching, in its entirety, a space station including all essential subsystems. The space station fulfills the goal of providing a permanent manned presence in space which allows for several important functions: (1) a national laboratory in space, (2) a permanent observatory, (3) a manufacturing facility, (4) and a servicing facility. The space station of the present invention may serve as an assembly facility, storage depot, and staging base for other space missions.

Figure 1A:
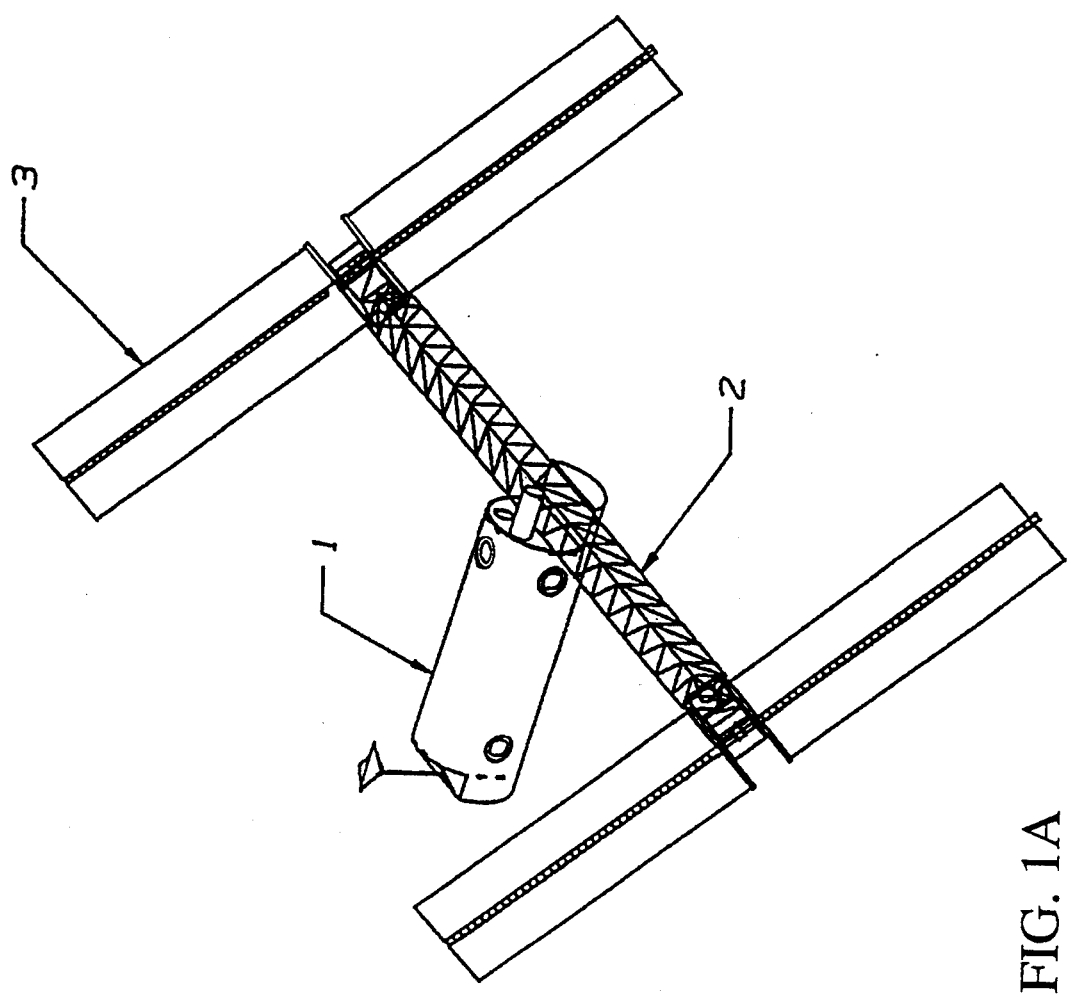
FIG. 1A is an isometric view of an overall space station configuration in accord with the present invention.

Referring to the drawings, and more specifically to FIG. 1A, there is shown the overall space station configuration after deployment on-orbit. Core module 1 contains the habitation and laboratory quarters, as well as most of the subsystems of the space station. Truss 2 is one of two deployable trusses each of which extends outwardly in cantilevered fashion from core module 1. In a preferred embodiment, each truss is approximately $9 \times 9$ foot square (6.3 square meters) and 107 feet long (32.5 meters).

Figure 1B:
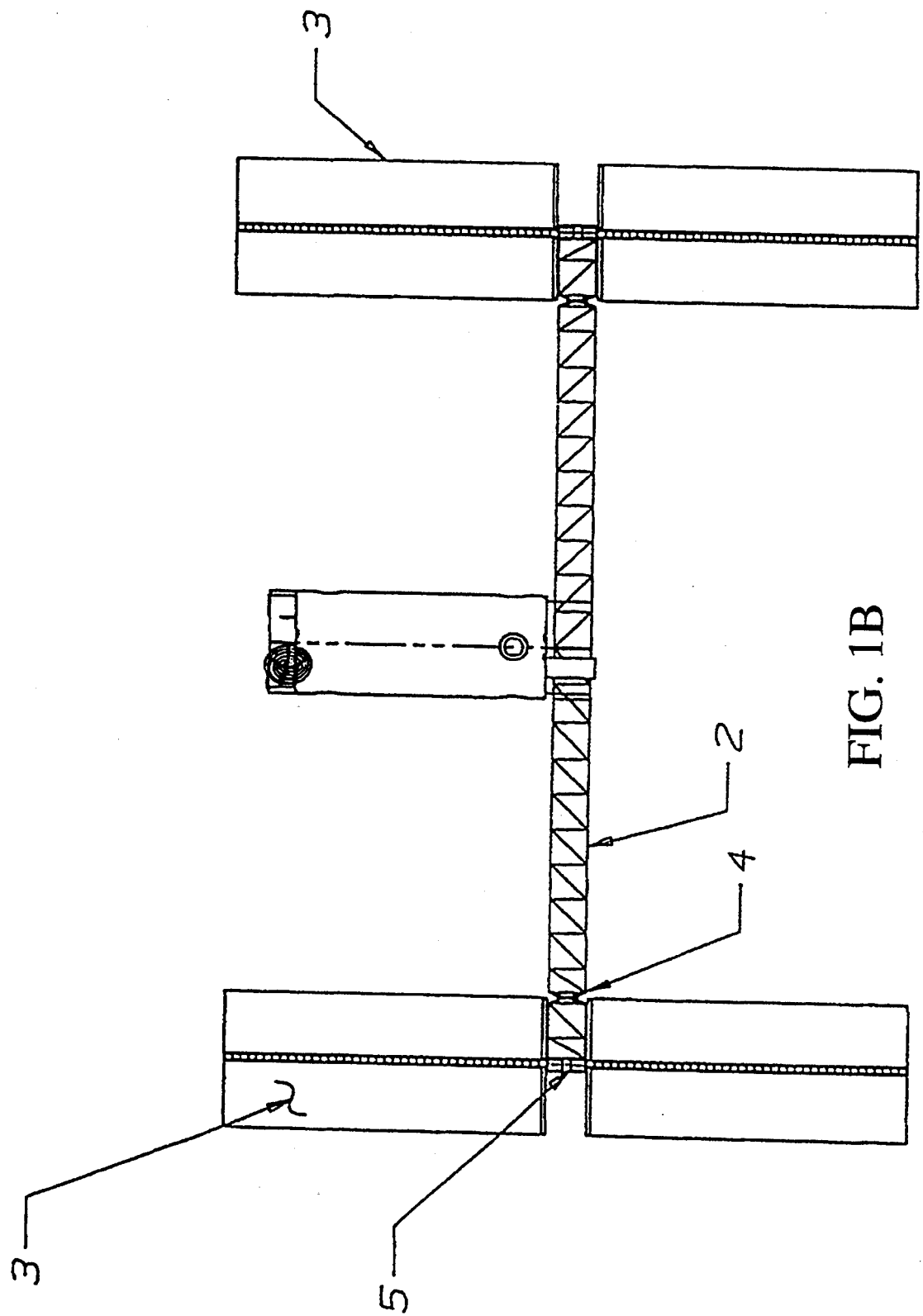
FIG. 1B is an elevational view of the overall space station configuration of FIG. 1A.

On each truss, a solar panel array 3 is disposed (see also FIG 1B). In a preferred embodiment, the power generated by both solar panel arrays 3 is in the range of 37.5 Kilowatts. Alpha joint 4 and beta joint 5 are rotating joints that orient the solar panel arrays so they are perpendicular to the sun or sun axis to maximize the energy generated thereby. The space station is designed so that it may be oriented for either LVLH (local-vertical local-horizontal) or SI (solar inertial) flight. Regardless of the flight orientation, alpha joint 4 and beta joint 5 optimize solar array orientation. However, the SI flight mode requires little or no continuous solar array adjustment. The total dimensions of solar panel array 3 on one end of truss 2 controlled by one set of rotating alpha and beta joints 4 and 5 are preferably about 32 feet wide (10 meters) and 170 feet long (51.5 meters).

Figure 2A:
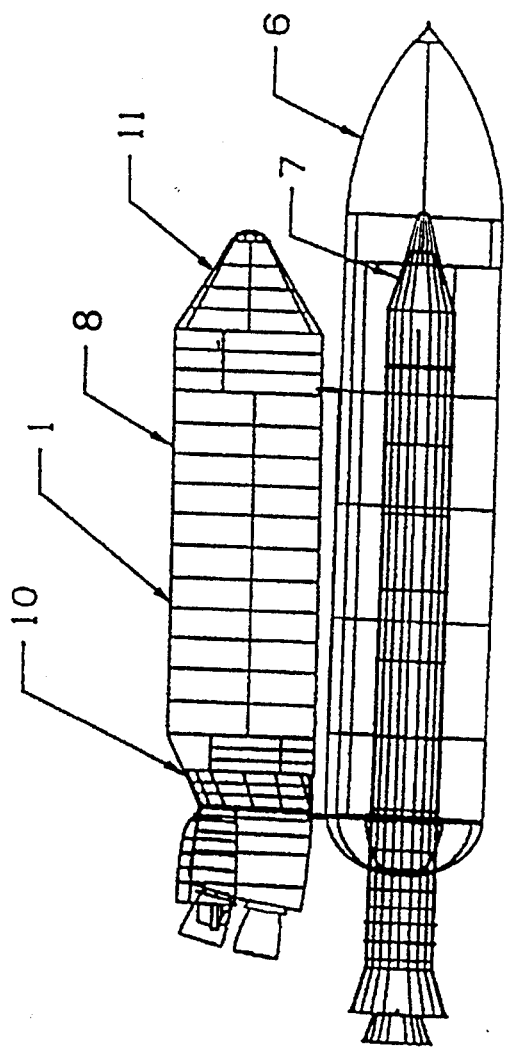
FIG. 2A is an elevational view showing the space station and launch vehicle configuration in accord with the present invention.
Figure 2B:
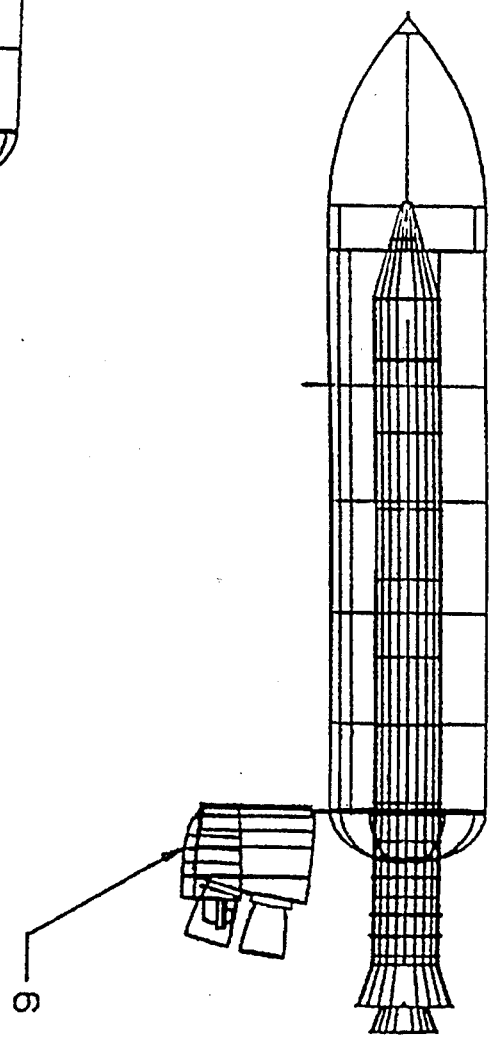
FIG. 2B is an elevational view showing the separate portions of the overall space station configuration of FIG. 2A.

FIGS. 2A and 2B show a representative heavy-lift launch vehicle and launch package. The heavy-lift launch vehicle is configured the same as the current Shuttle Orbiter launch vehicle. Because this launch vehicle is presently available, costs for its use are reduced as compared to building a new launch vehicle. External tank 6 is substantially cylindrical and is filled with fuel for the launch. Two solid rocket boosters 7 mount laterally on each side of external tank 6. Instead of having the Shuttle Orbiter as the payload, the method of the present invention substitutes payload 8. Payload 8 includes station core module 1. Core module 1 is approximately 80 feet long (25 meters) and substantially cylindrical. On the aft side of core module 1 is propulsion module 9. Propulsion module 9 is similar to the current propulsion module of the Shuttle Orbiter. Propulsion module 9 is preferably ejected from the space station core module at the proper time after lift off. The outer structure of the propulsion module 9 can be seen to be non-cylindrical. Thus, physically coupling of propulsion module 9 to cylindrical core module 1 presents potential stress related problems. For this purpose, transition section 10 is used. The primary purpose of transition section 10 is to transfer thrust loads from the engines to the remainder of payload 8. The outer cover of transition section 10 is also designed to serve as an aerodynamic fairing. An aerodynamic fairing is a secondary structure added to any part of an aircraft to reduce drag by improving the streamlining. Transition section 10 is preferably ejected during the launch sequence. On the forward side of core module 1 is forward shroud 11. The main purpose of forward shroud 11 is to improve streamlining whereby forward shroud 11 also acts as an aerodynamic fairing.

Figure 3:
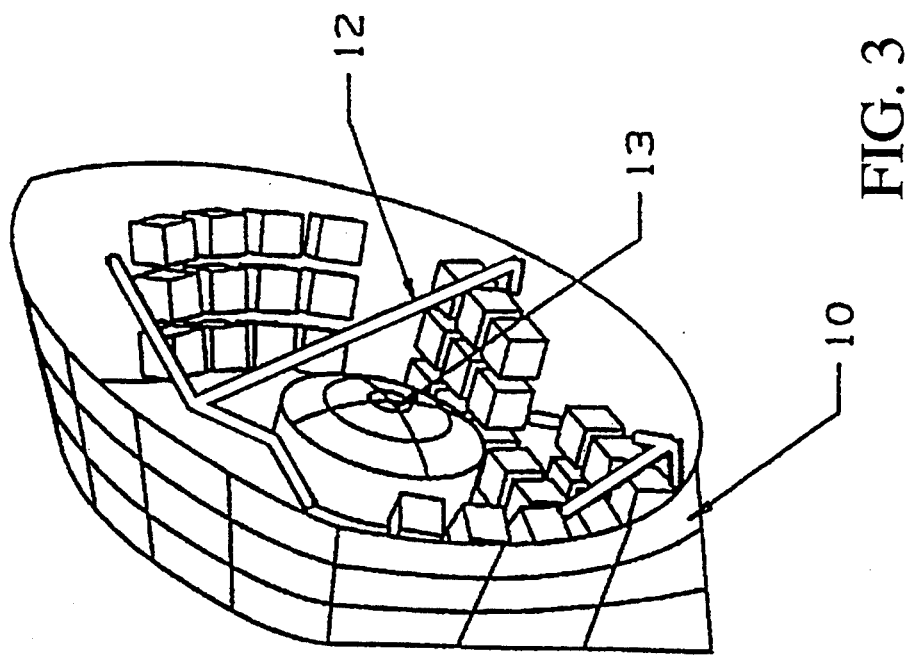
FIG. 3 an isometric view of the aft transition section shown in FIG. 2B.

Aft transition section 10 is shown in more detail in FIG. 3. Thrust structure 12 transfers force from the non-cylindrical structure of propulsion module 9 to the cylindrical structure of core module 1. Although thrust structure 12 is shown in FIG. 3 to be substantially positioned well within the interior of aft transition section 10, thrust structure 12 could also be disposed closer or next to the outer surface or aerodynamic fairing of aft transition section 10. Pressurized avionics package 13 is shown included in transition section 10, but could also be disposed in core module 1. Because aft transition section 10 is jettisoned, it may be desirable to have avionics package 13 disposed in core module 1 to allow avionics package 13 to be reusable. Aft transition section 10 also contains separation or ejection provisions, electrical power and electrical conversion and distribution circuits.

Figure 4A:
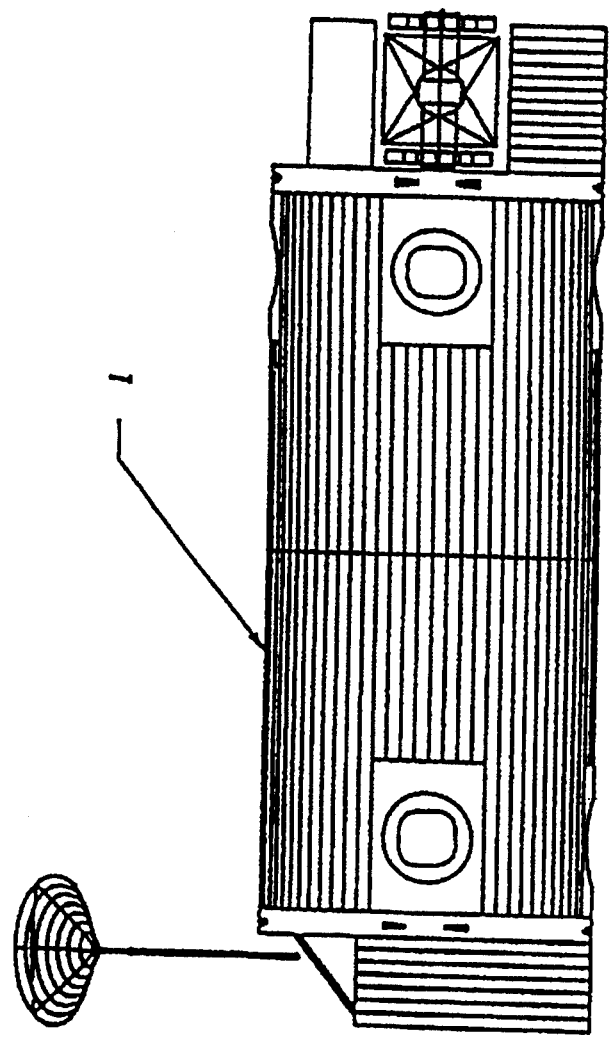
FIG. 4A is an elevational view of a space station core.
Figure 4B:
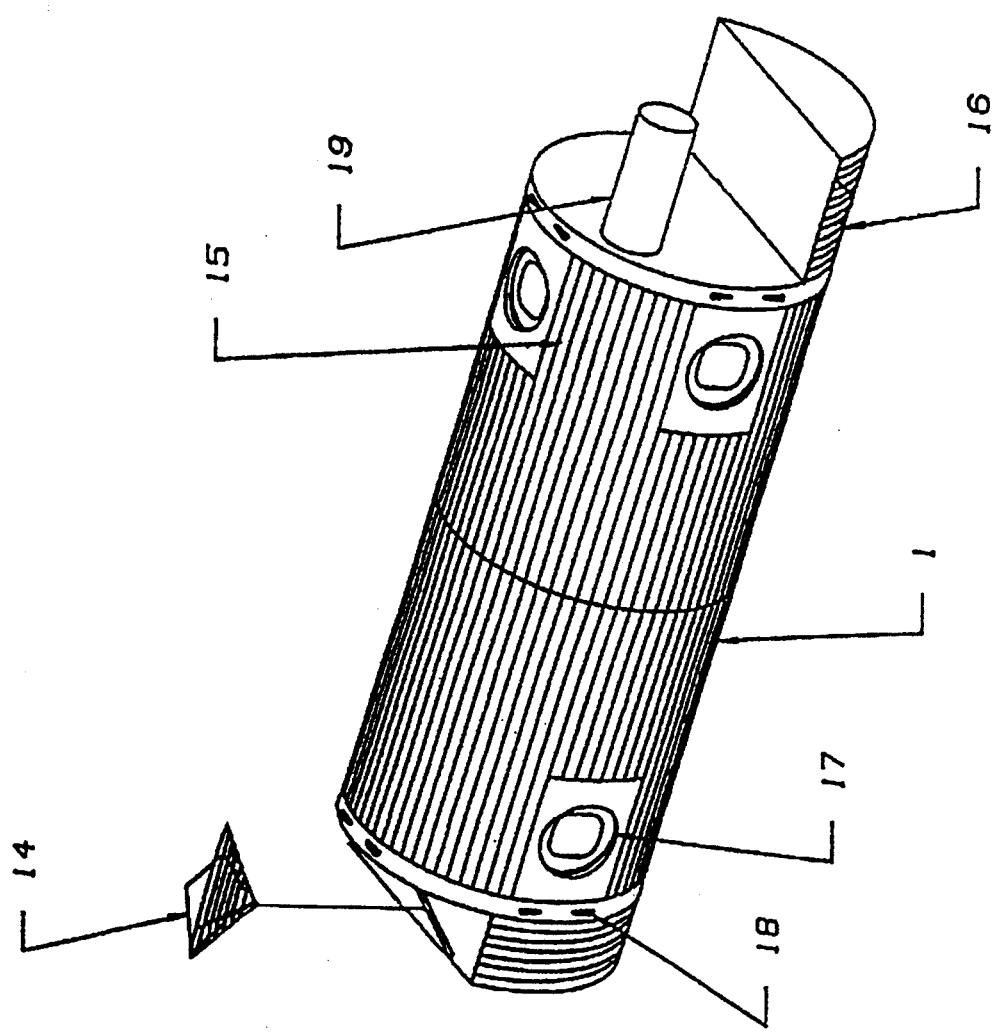
FIG. 4B is an isometric view of the space station core of FIG. 4A.

In FIG. 4A and 4B, some preferred external features of the present invention are disclosed. TDRSS (tracking and data relay satellite system) antenna 14 is deployable and has a 12 foot (3.6 meter) diameter dish section. Radiator panels 15 mount on the exterior of core module 1 to reject waste heat from various systems. The radiator panels 15 must be protected from the ascent heating environment. An internal working fluid is pumped through the various systems to pick up the waste heat they generate. The internal working fluid is transferred via heat exchangers on the Thermal Control System pallets 33 and 37 to an external working fluid. The external working fluid flows through the radiator panels 15 and is radiated to space. Radiator panels 16 are used for the same purpose as radiator panels 15, but are curved to mount circumferentially on core module 1. Deployable radiators could also be used, and may be especially desirable if the space station power is increased by adding additional solar panels in a manner to be discussed. For instance, curved and hinged radiator panels may be designed to open outwardly with respect to core module 1 and thereby significantly increase heat rejection capability.

Figure 5A:
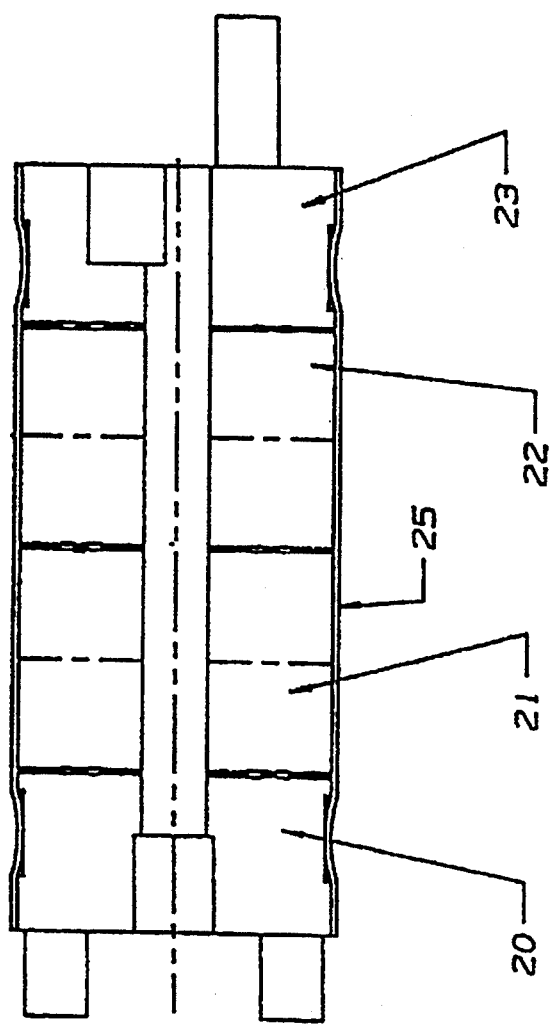
FIG. 5A is an elevational view schematic of a space station core.
Figure 5B:
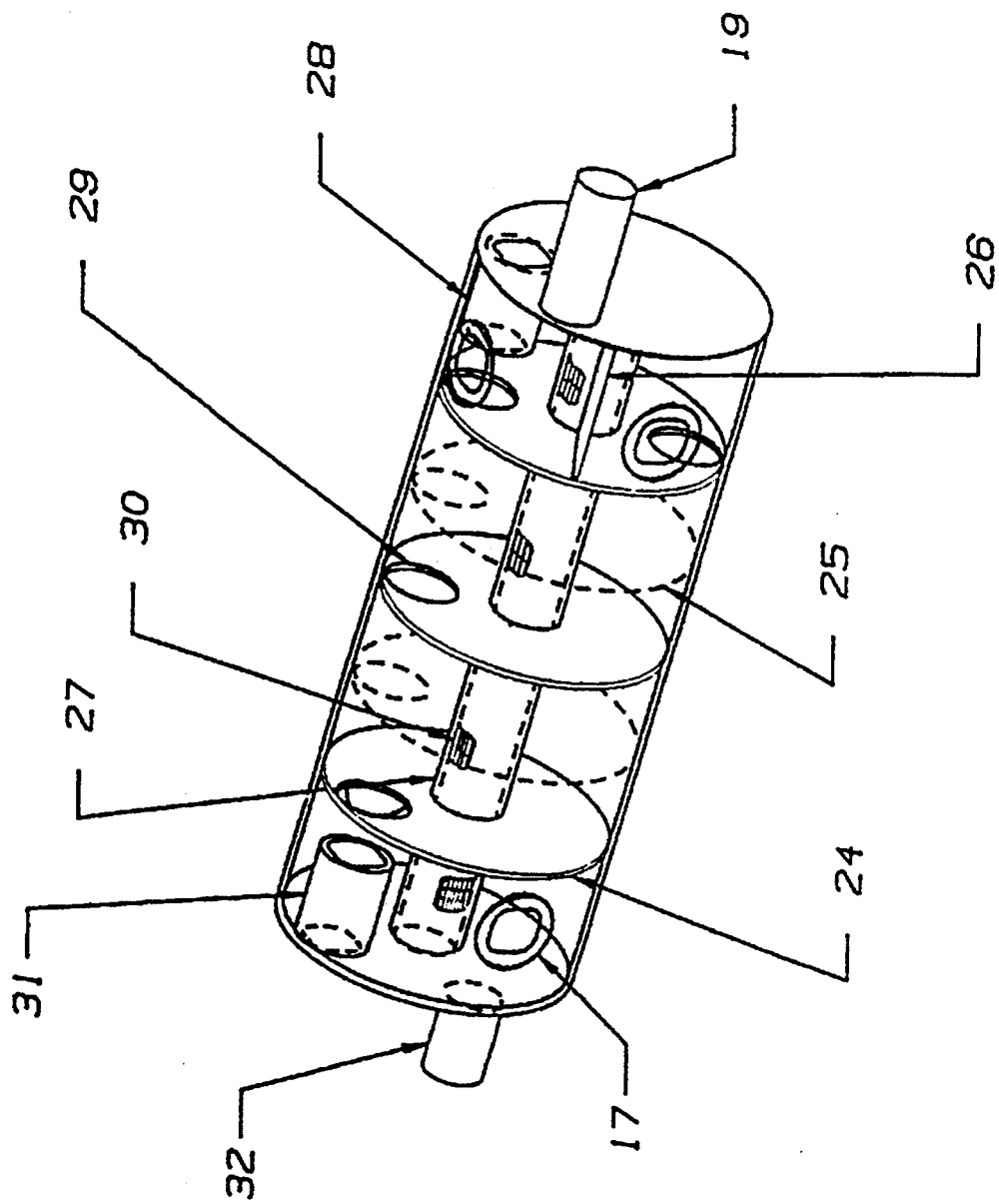
FIG. 5B is an isometric view, in cut-away, of the space station core of FIG. 5A.
Figure 13:
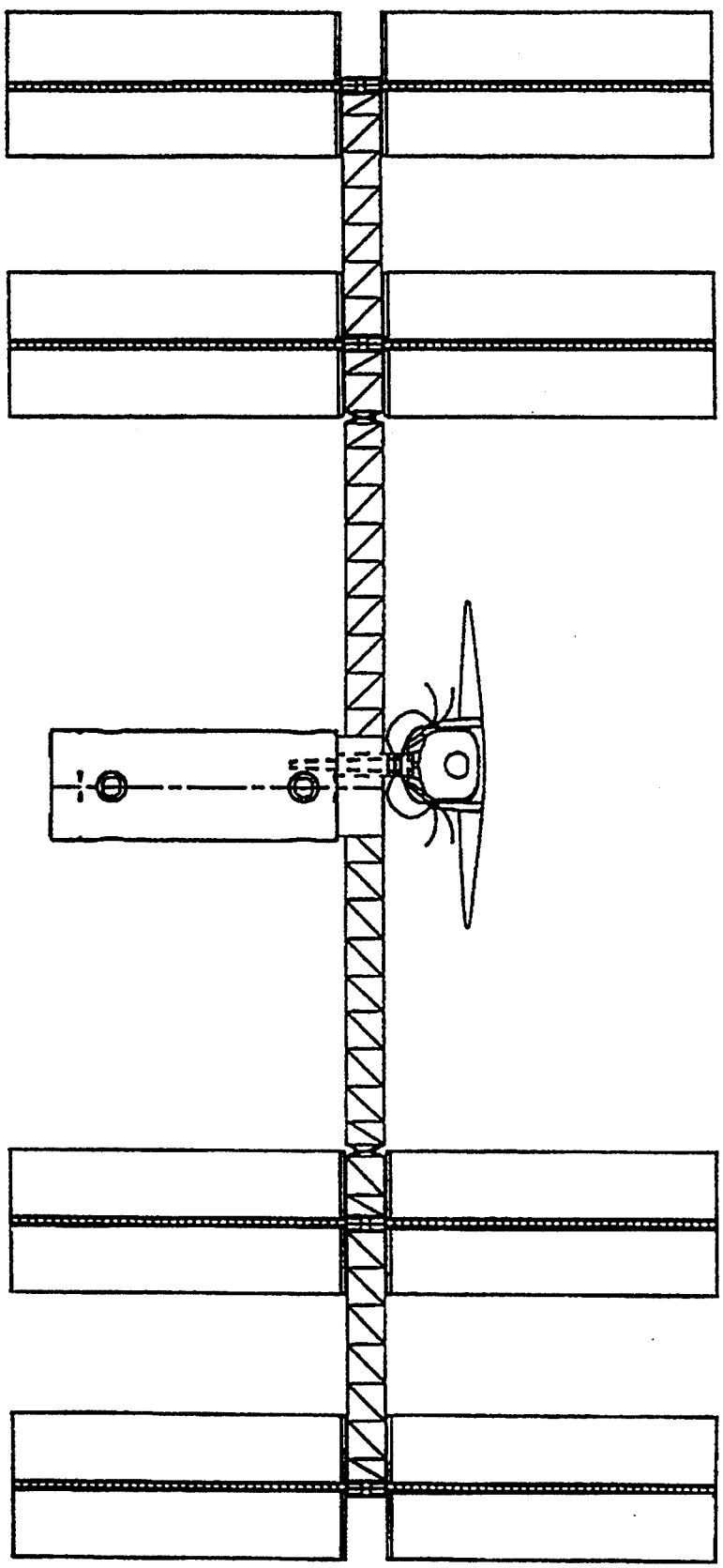
FIG. 13 is an elevational view of growth options of a space station in accord with the present invention.

Radial berthing ports 17 are built into station core 1 in various positions about its circumference. Although only three radial berthing ports 17 are shown in FIG. 4B, a total of seven are used in a preferred embodiment of the present invention. RCS (reaction control system) nozzles 18 control the space station once in orbit. As indicated hereinbefore, the space station flight attitude may be either LVLH (local-vertical local-horizontal) or SI (solar inertial). The attitude will be controlled by RCS nozzles 18. Primary docking tunnel 19 is used to dock the Shuttle Orbiter as shown in FIG. 13. Primary docking tunnel (shown also in FIG. 5B) is preferably about 12 feet (3.6 meters) in length and 5 feet (1.5 meters) in diameter. FIG. 5A is a schematic diagram showing the basic configuration of the pressurized middle volume of core module 1. The pressurized middle volume of core module 1 is preferably in the range of 25 feet (8 meters) in diameter and 62 feet (20 meters) in length. Thus, the space station of the present invention provides a reasonably sized living and working space of about 30K cubic feet (900 cubic meters). The pressurized middle volume is preferably divided into four compartments and a central tunnel 27. The central tunnel 27 extends along the length of the pressurized middle volume, as shown in FIG. 5A and FIG. 5B.

Compartment 20 is a service compartment which contains various service equipment. Compartment 21 is a laboratory compartment. The design of the present invention provides that the laboratory has a micro-gravity environment for experimentation in either the LVLH flight mode or the SI flight mode. In the SI flight mode, the micro-gravity vector rotates at orbit rate. Compartment 22 is the habitation compartment and compartment 23 is the command center compartment.

The compartments are separated by pressurized internal bulkheads 24. Bulkheads 24 extend radially outward from the central tunnel 27. They are substantially circular and have a planar face surface orthogonal or transversely disposed with respect to central tunnel 27. Bulkhead 25 separates the compartments in a similar manner as bulkhead 24, however bulkhead 25 is unpressurized. Radial partitions 26 may also be used to separate areas within the compartments. The radial partitions 26 extend outwardly from central tunnel 27. Their planar face surface is preferably parallel to the central tunnel 27.

Central tunnel 27 serves as a means for moving from compartment to compartment. It also provides a central region that may be more protected than the compartments with respect to radiation or other disturbances that may arise. Tunnel hatches 30 permit crew members to go into or come out of the compartments. Bulkhead hatches 29 also allow movement between compartments. Bulkhead hatches 29 can be pressure sealed to seal the compartments from each other. Thus, several routes for leaving or entering a compartment are available. Furthermore, a crew member may leave a compartment going one direction and then go through the tunnel past the same compartment going in the other direction. This configuration of hatches is sometimes referred to as a race-track configuration, and improves flight safety due to the alternate routes available to escape or avoid a hazard.

Forward airlock 28 and aft airlock 31 may be used for EVA (extra vehicular activity) purposes. Two international berthing tunnels 32 are used for attaching international modules, such as Japanese, European, or Russian modules to the main pressurized module. These tunnels are preferably approximately 7 feet (2.1 meters) long and about 5 feet (1.5 meters) in diameter (see also FIG. 6). The presence of international modules may cause a slight blocking of the solar arrays during segments of the space station rotation path around earth. However, such blockage is minimal and does not occur if the space station is kept in the SI flight mode rather than the LVLH flight mode. Thus, the international modules are accomodated in the currently preferred configuration with a minimum impact to the overall design.

Figure 6:
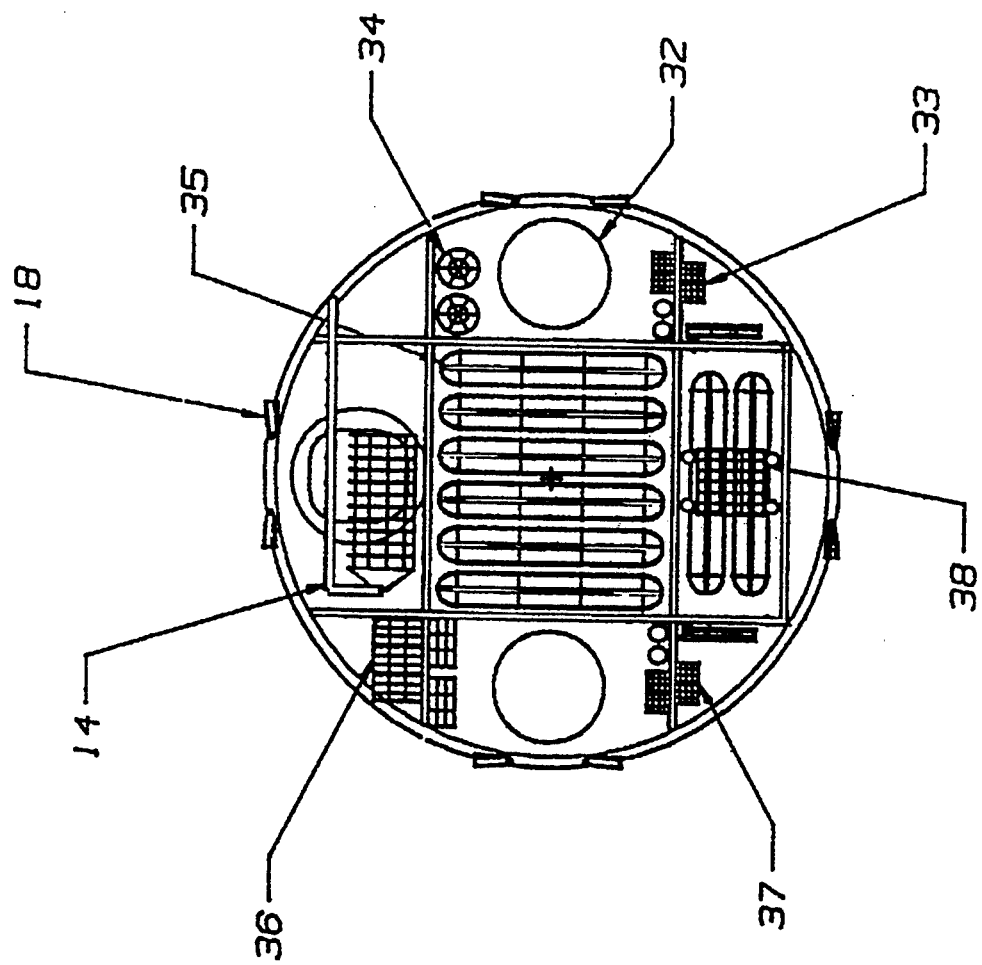
FIG. 6 is an elevational end view of the aft unpressurized equipment bay.

The aft unpressurized equipment bay is seen in greater detail in FIG. 6. Antenna 14 is shown in its folded position prior to deployment. RCS nozzle 18 and other RCS nozzles are shown distributed about the circumference of the aft equipment bay. Seventy degree Fahrenheit thermal control system pallet 33 and thirty-five degree Fahrenheit thermal control system pallet 37 are used for rejecting waste heat. Propulsion tanks 35 are arranged in four pallets with each pallet containing six tanks. The tanks are each about 1½ feet (0.46 meters) in diameter and 10 feet (3 meters) long. There are ten energy storage ORU's (orbital replacement units) 36. Four resistojet modules and reboost thrusters 38 are also disposed in the aft unpressurized equipment bay. These may be used to provide a delta-velocity necessary to raise the station orbit.

Figure 7A:
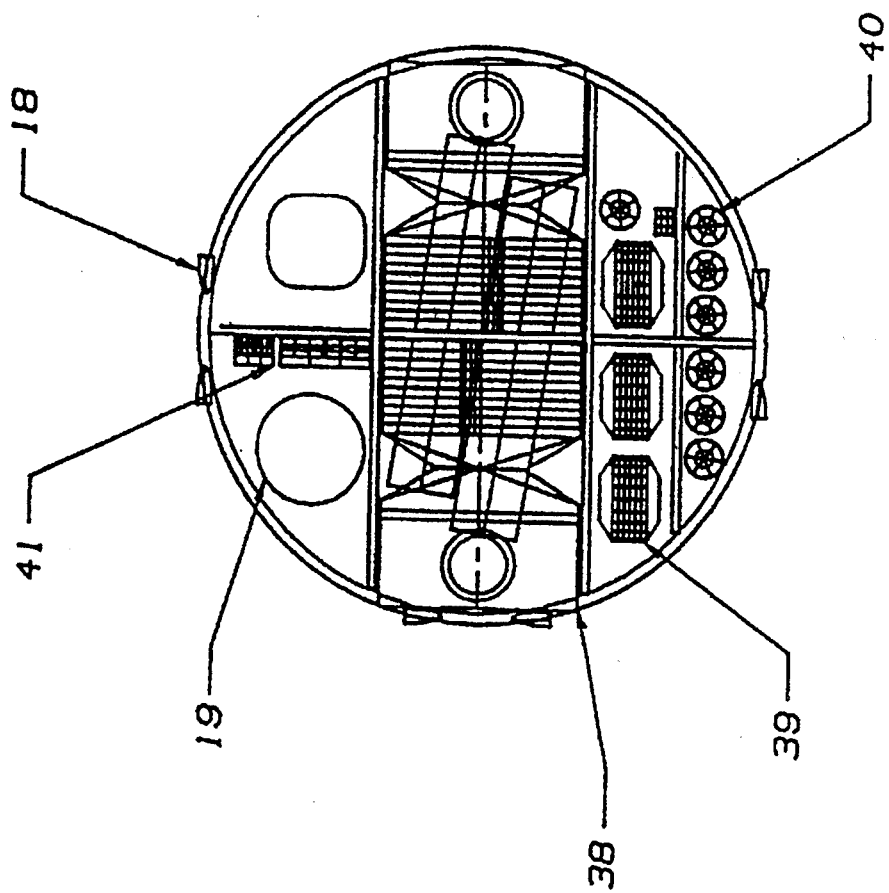
FIG. 7A is an elevational end view of the forward unpressurized equipment bay.
Figure 7B:
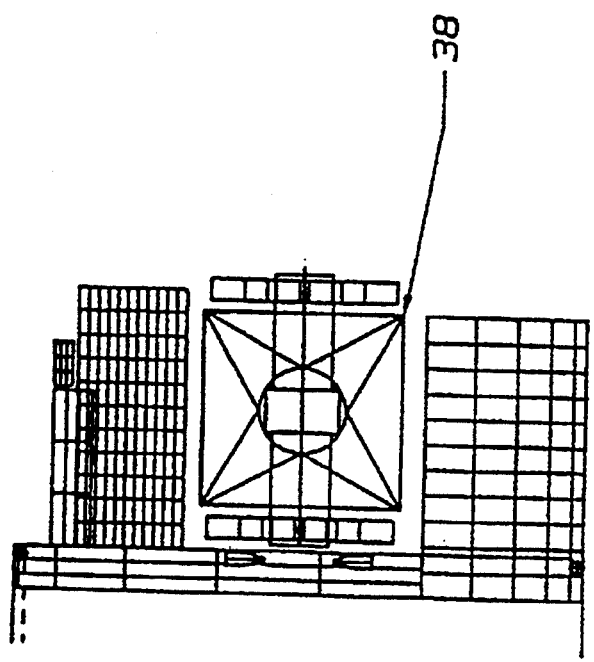
FIG. 7B is an elevational side view of the forward unpressurized equipment bay of FIG. 7A.

FIGS. 7A and 7B show front and side views of the forward unpressurized equipment bay with the truss 38 in a folded position. Six CMG's (control movement gyros) stabilize the space station in the desired attitude as it orbits the earth, preferably either in LVLH (local-vertical local-horizontal) or SI (solar inertial) positions. FMAD (fluid management and distribution) pallet equipment 40 is also preferably placed in the forward unpressurized equipment bay. PMAD (power management and distribution) equipment 41 is also shown.

Figure 8A:
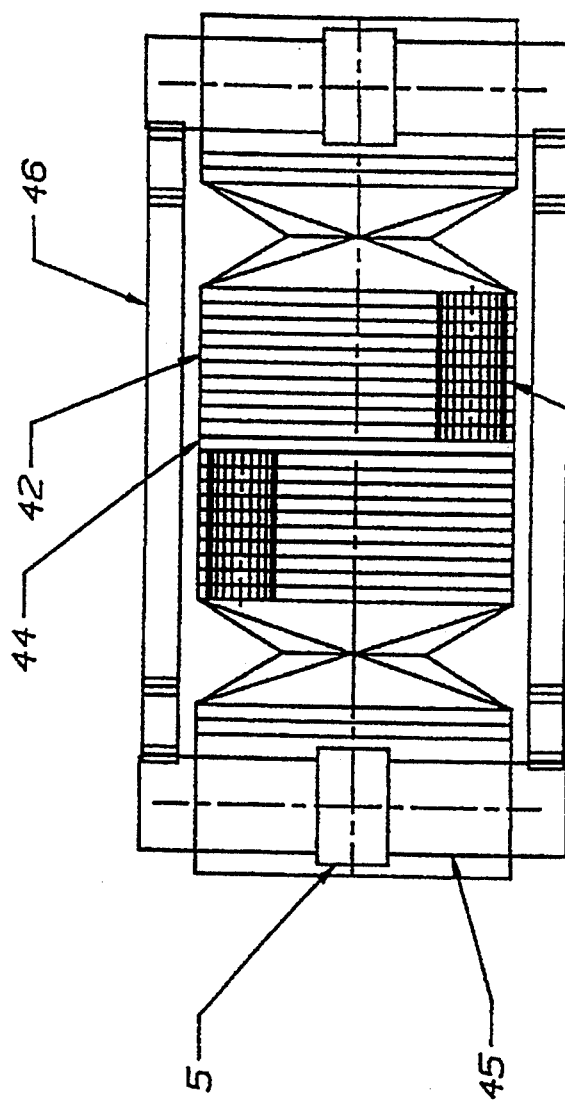
FIG. 8A is an elevational view of the truss package layout.
Figure 8B:
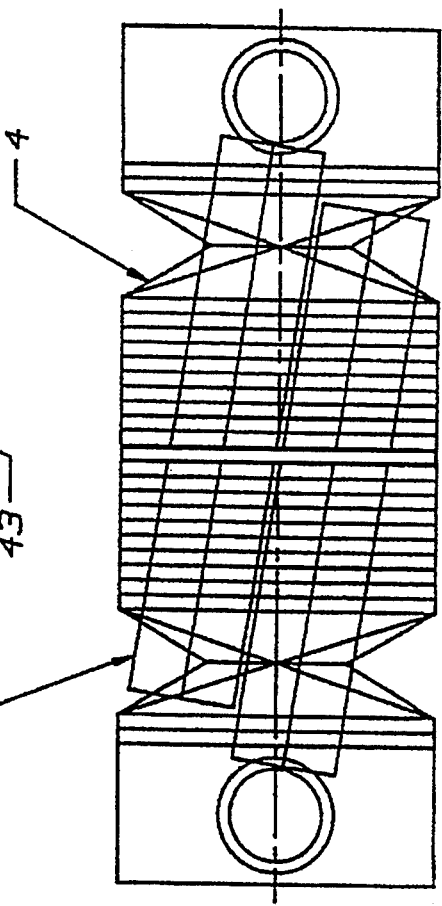
FIG. 8B is an elevational view, showing different features of the truss package layout of FIG. 8A.
Figure 10B:
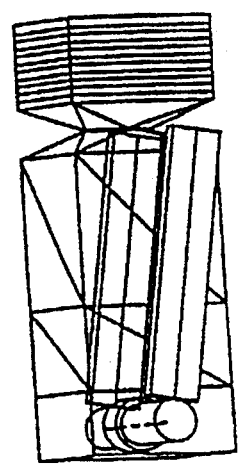
FIG. 10 is a series of isometric views showing the sequence of solar array deployment.
Figure 10A:
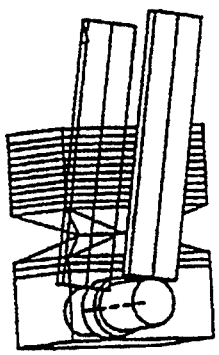
Figure 10C:
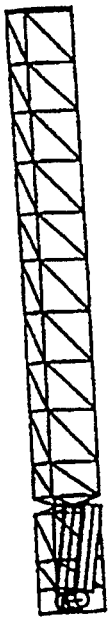
Figure 10D:
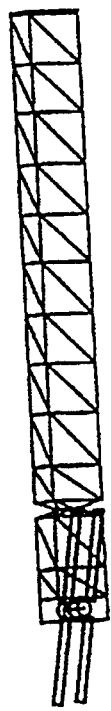
Figure 10E:
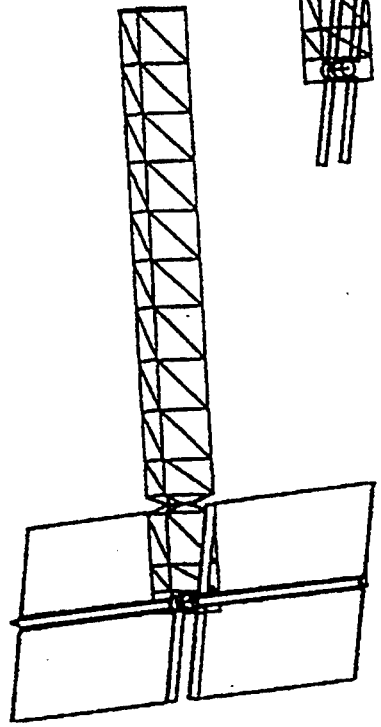

The truss package layout in the forward unpressurized equipment bay is shown in greater detail in FIG. 8A and FIG. 8B. Two trusses 42 are shown in the folded configuration. A deployment means 43, which may be of several types, is used for extending the trusses. The two trusses 42 fasten securely to carrier plate 44 in cantilevered fashion. Solar array boxes 46 contain the folded solar arrays. Both folded trusses 42 have a square 9×9 foot (2.7×2.7 meters) cross-section and together have a folded length of approximately 24½ feet (7.5 meters).

FIGS. 9A and 9B shows the basic configuration of the square truss 42 and solar arrays. Fully deployed solar array 3 is shown in FIG. 9A. One quarter of the solar array on one truss measures approximately 18 feet (5.45 meters) wide and 79 feet (23.9 meters) long. The distance between truss sections in truss 42 is approximately 9 feet (2.7 meters). Alpha rotating joint 4 is shown in more detail in FIG. 9B along with solar array boxes 46.

FIG. 10 shows a schematic of the sequence of deployment of the truss and solar arrays. While only one side is shown, both sides are preferably deployed simultaneously from core module 1. In the presently preferred embodiment, the section of truss 42 outside the alpha rotating joint is expanded first. The remainder of the truss subsequently expands. In this manner, the single truss shown deploys from a compressed length of approximately 12 feet (3.6 meters) to an expanded length of about 107 feet (32.5 meters). After expansion of truss 42, the solar array deploys. Four boxes, each containing one quarter of the solar array for one side of the truss, are oriented by the beta joint. Two boxes on each side of the truss are aligned longitudinally with each other. The boxes then open for deployment of the solar arrays in a manner known to those skilled in the art.

Figure 11:
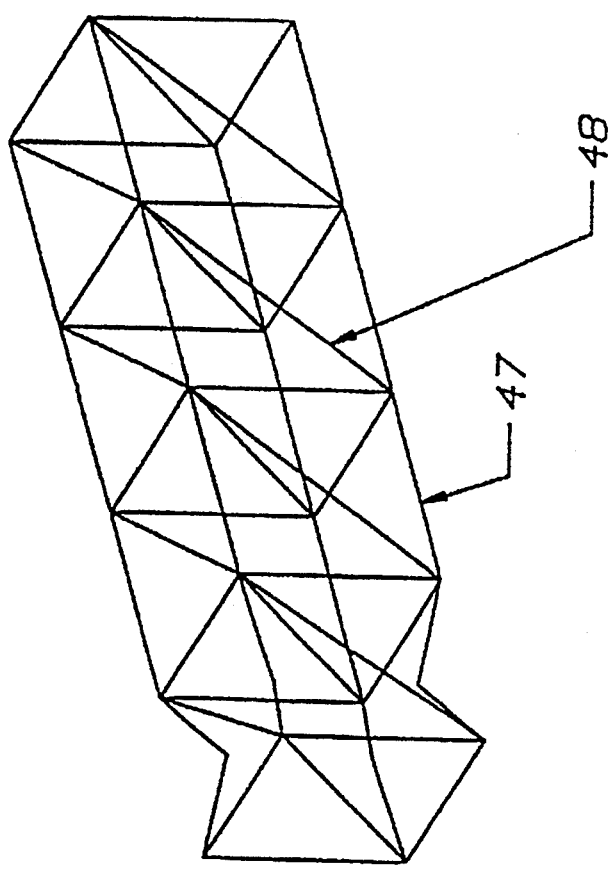
FIG. 11 is an isometric view of the truss showing structural support elements in the truss package.

FIG. 11 shows details of the elements of truss 42 relating to moving from a folded position to a deployed position. As shown, longerons 47 fold to thereby greatly compress the length of truss 42 in the folded position. Diagonal members 48 telescope to adjust their length for the folding of longerons 47. Thus, the truss structure can collapse to a significantly smaller length.

Figure 12:
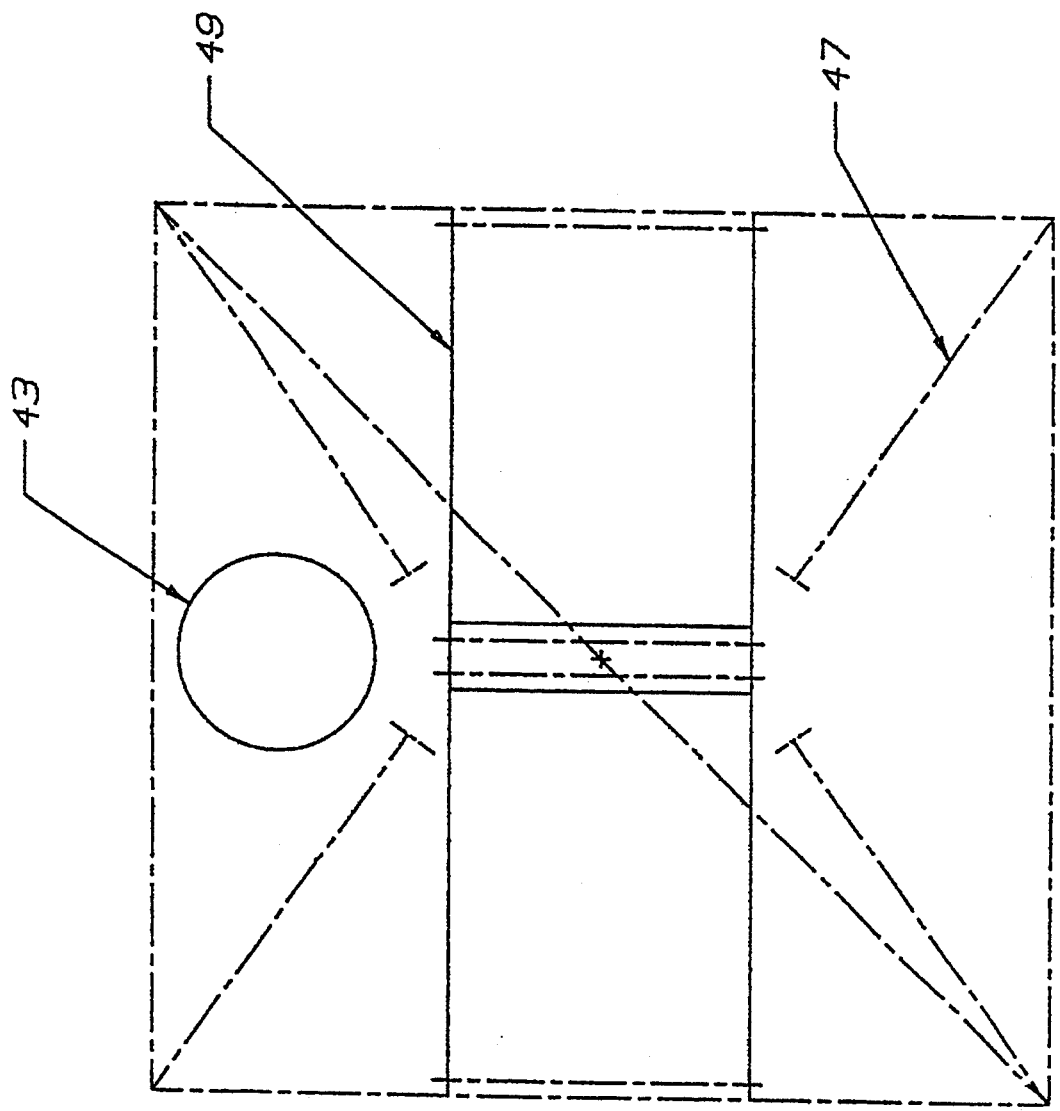
FIG. 12 is a schematic view of the square dimension of the truss in accord with the present invention.

FIG. 12 provides a schematic of the cross-section of truss 42 to show the preferred location of the elements of the truss as compressed. Longerons 47 are folded inwardly for compression purposes so that they are at an angle of approximately 35° from the upper horizontal as indicated in FIG. 12. The means for deployment 43 may be of several types. It preferably mounts in truss 42 in the general position indicated. Schematically indicated cable trays 49 contain the wiring for the truss and solar arrays. The cable trays may also carry power cables, data cables, and fluid lines. The cable trays are fan folded when the truss is in the folded or undeployed position.

Figure 14:
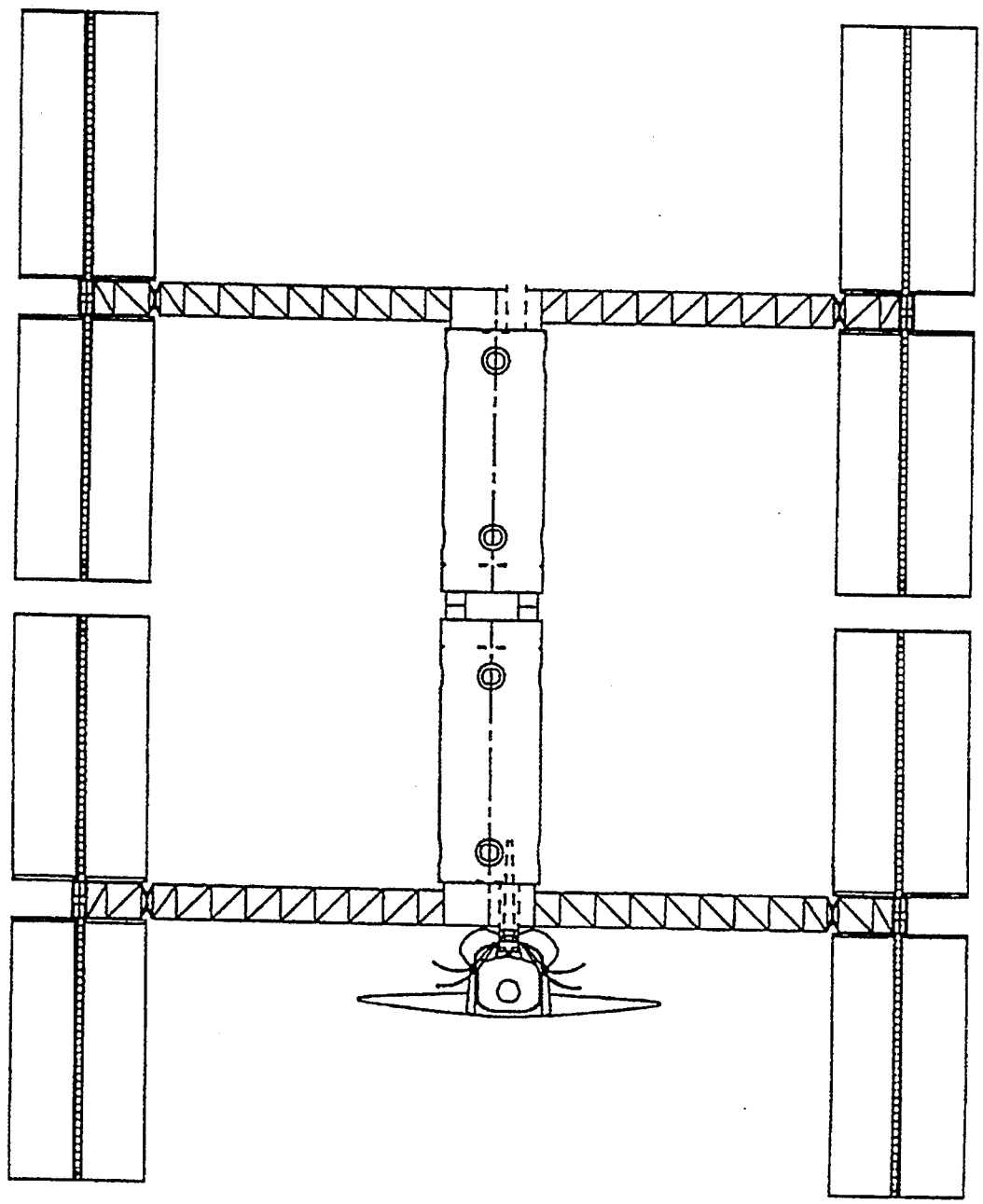
FIG. 14 is an elevational view of an alternative growth option involving module duplication.
Figure 15:
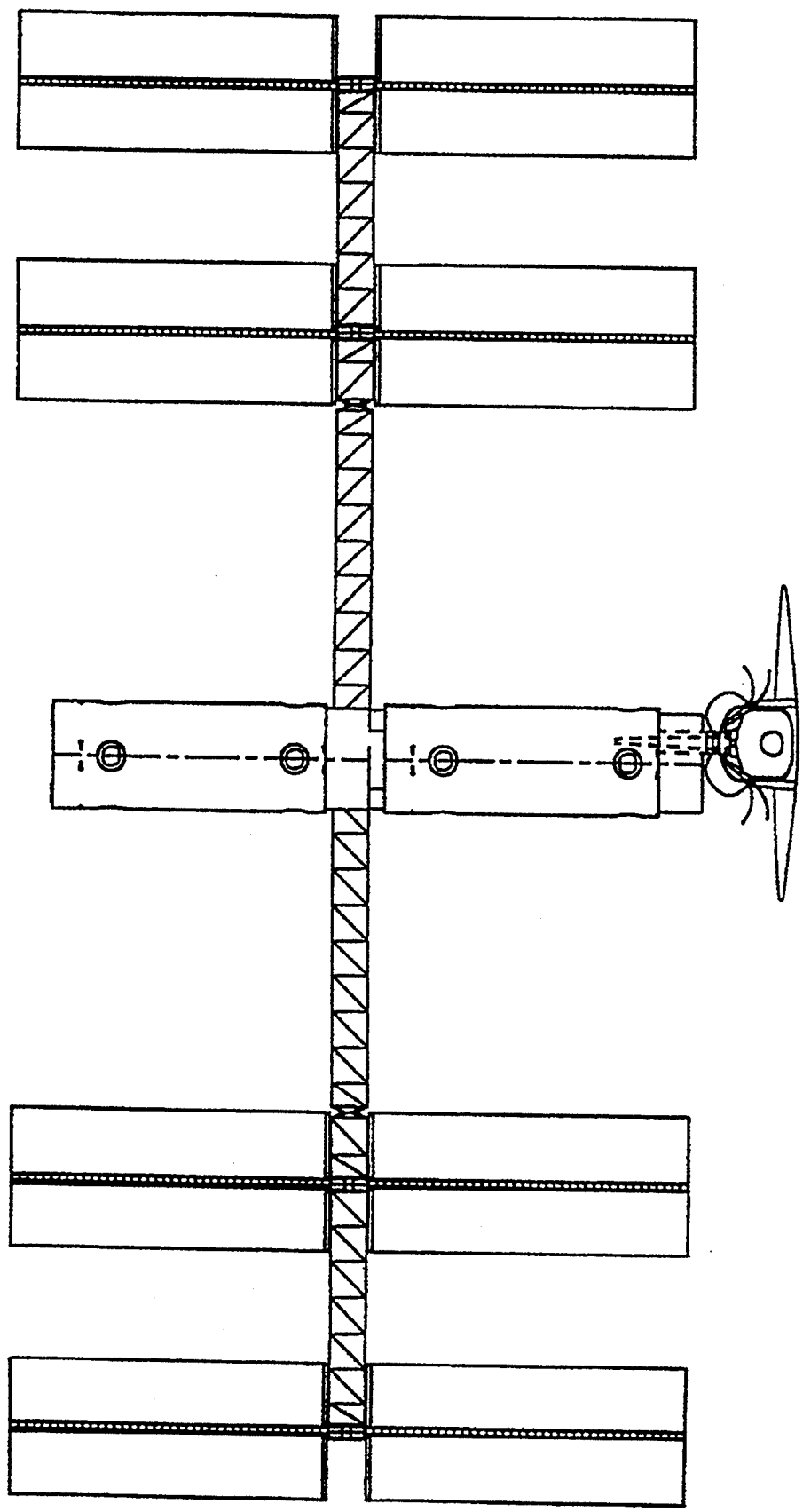
FIG. 15 is an elevational view of another alternative growth option involving added solar arrays and a core module.

Various growth or development options are possible with the space station of the present invention to accommodate any desired future supplementation of station size. FIG. 13 provides a view of one possible growth option. In this option, solar arrays are added to each truss outside the present solar arrays. The additional solar arrays effectively double the power generating capability of the space station from 37.5 KW to 75 KW. The extra solar arrays could be transported to the space station by the Shuttle Orbiter. Another possible growth option is shown in FIG. 14. In this case, two of the basic configurations attach to each other back-to-back. This growth option not only doubles the power generated to 75 KW but also doubles the module volume. This option requires another heavy-lift as discussed. FIG. 15 shows another growth option which doubles the power in the manner shown in FIG. 13 but also provides for doubling module volume.

The space station essential systems are all pre-integrated on Earth. That is, the systems are built into and, so far as possible, tested on Earth. This eliminates most of the EVA required for many other space station designs. Pre-integrated systems are more likely to be reliable than systems put together on-orbit because of the extensive testing that can be accomplished while on Earth. Pre-integration also reduces costs for construction time as compared to EVA construction. Internal pre-integrated subsystems include, but are not limited to, electrical power systems, data management systems, fluid management systems, guidance and control systems, communication and tracking systems, and atmospheric control systems. External subsystems include, but are not limited to, the propulsion system, thermal control system, avionics system, and the power system. Because the space station is put in orbit at one time, subsequent Shuttle Orbiter flights are not success or time critical. The space station of the present invention provides for ten docking or berthing ports, two airlock ports, and windows disposed forward, aft, and radially on core module 1. A MT (mobile transporter) for moving along the truss and a cart or robotic arm to be attached to the MT may be shipped to the space station by the Shuttle Orbiter as desired.

The Shuttle derived launch vehicle is a heavy-lift type launch vehicle which can lift in the range of approximately 180,000 pounds (81,360 kilograms). The payload, which includes the space station of the present invention, weighs somewhat less than this value to provide some safety margin for the launch. In operation, the heavy-lift launch vehicle separates from the payload containing the space station a relatively short time after take-off. Sometime after that, the propulsion module 9 and transition section 10 will be jettisoned. As core module 1 approaches its orbital position, forward shroud 11 is jettisoned. In the presently preferred embodiment, the space station would be operational after the initial launch. In the preferred embodiment, the space station would not be permanently manned until two "lifeboats", or emergency re-entry vehicles, are attached to the station for emergency exiting of the space station. The two "lifeboats" would require two additional Shuttle Orbiter flights for placement alongside the space station. Thus, the space station of the present invention, while fully operational after placement in orbit, would preferably be permanently manned after the third space flight.

The space station useful life span is variable depending on maintenance, replacement, growth, and other factors. Thus, the expected useable life-span of the space station of the present invention may range from 15 years to over 30 years. The body mounted radiators discussed hereinbefore also serve to protect from meteoroid and debris to thereby increase the useable life-span of the space station of the present invention.

The Shuttle Orbiter referred to herein is well known to those skilled in the art and generally recognized by the U.S. public. Many documents are available to describe its general features.

The foregoing disclosure and description of the invention is illustrative and explanatory thereof, and it will be appreciated by those skilled in the art, that various changes in the size, shape and materials as well as in the details of the illustrated construction, growth options, or combinations of features of the various space station elements may be made without departing from the spirit of the invention.

What is claimed is:

1. A space station and launch vehicle combination, comprising:
   a substantially elongate external tank with at least one rocket engine laterally disposed with respect to said external tank; and
   a payload laterally disposed with respect to said external tank, said payload further including:
      a first space station core module including an unpressurized forward volume, an unpressurized aft volume, and a pressurized middle volume,
      a propulsion module removably disposed adjacent said unpressurized aft volume,
      a transition section removably disposed between said pressurized middle volume and said propulsion module, said transition section having an outer covering forming an aerodynamic fairing in surrounding relationship to said unpressurized aft volume, and
      a removably disposed forward shroud in surrounding relationship to said unpressurized forward volume, said forward shroud forming an aerodynamic fairing.

2. The combination of claim 1, wherein:
   said first space station core module includes a substantially cylindrical outer frame,
   said propulsion module includes a substantially non-cylindrical outer frame, and
   said transition section includes a thrust structure means disposed within said outer covering operational for transferring a launch load developed by said propulsion module from said substantially non-cylindrical outer frame of said propulsion module, to said substantially cylindrical outer frame of said first space station core module.

3. The combination of claim 1, wherein said pressurized middle volume further comprises:
   a plurality of curved radiator panels disposed about a circumference of said pressurized middle volume.

4. The combination of claim 1, wherein said payload further comprises:
   two extendable trusses which when extended are cantilevered from said first space station core module; and
   a solar array on each end of said two extendable trusses, said two extendable trusses being adaptable for adding additional solar arrays on respective ends of said two extendable trusses.

5. The combination of claim 1, wherein said payload further comprises:
   means for attaching a second space station core module to said first space station core module.

6. A space station payload for a launch vehicle, said space station payload being capable of being launched into space and comprising:
   a space station core module including an unpressurized forward volume, an unpressurized aft volume, and a pressurized middle volume, said pressurized middle volume having a substantially cylindrical outer frame;
   a propulsion module removably disposed adjacent said unpressurized aft volume, said propulsion module having a substantially non-cylindrical outer frame;
   a transition section removably disposed between said pressurized middle volume and said propulsion module, said transition section having an outer covering forming an aerodynamic fairing in surrounding relationship to said unpressurized aft volume, said transition section having a thrust structure means operational for transferring a launch load developed by said propulsion module from said substantially non-cylindrical outer frame of said propulsion module to said substantially cylindrical outer frame of said space station core module; and
   a removably disposed forward shroud in surrounding relationship to said unpressurized forward volume, said forward shroud forming an aerodynamic fairing.

7. The space station payload of claim 6, wherein said pressurized middle volume further comprises:
   a substantially centrally disposed tunnel within said pressurized middle volume,
   a plurality of bulkheads extending radially outwardly from said centrally disposed tunnel, said plurality of bulkheads defining a plurality of separate compartments within said pressurized middle volume; and
   a plurality of tunnel hatches to said centrally disposed tunnel from respective ones of said plurality of separate compartments.

8. The space station payload of claim 6, further comprising:
   a plurality of bulkhead hatches disposed within respective ones of said plurality of bulkheads for sealably interconnecting said plurality of separate compartments.

9. The space station payload of claim 6, wherein said space station core module further comprises:
   integrated systems including means for stabilizing said space station core in either a local-vertical local-horizontal attitude or a solar inertial attitude.

10. The space station payload of claim 6, wherein said space station core module further comprises:

a primary docking tunnel for a shuttle orbiter and at least one berthing tunnel suitable for connection to at least one additional space module.

11. The space station payload of claim 6, wherein said space station core module further comprises:
a pair of compressed trusses;
means for deploying said pair of compressed trusses in an outwardly extending cantilevered position with respect to said space station core module, and
a plurality of solar array boxes each containing deployable solar array elements.

12. The space station payload of claim 11, wherein said pair of compressed trusses further comprise,
foldable longerons longitudinally disposed with respect to said truss when said truss is in its outwardly extending cantilevered position, and telescoping diagonals diagonally disposed with respect to said truss when said truss is in its outwardly extending cantilevered position.

13. The space station payload of claim 11, wherein said pair of compressed trusses is disposed in said forward unpressurized volume.

14. A method for heavy-lifting a space station comprising:
selecting a shuttle derived launch vehicle for a heavy lift vehicle, said shuttle derived launch vehicle having a central fuel tank and at least one booster rocket laterally disposed to said central fuel tank;
providing a space station core module with an unpressurized forward volume, an unpressurized aft volume, and a pressurized middle volume;
providing an ejectable aerodynamic fairing as a forward shroud for said unpressurized forward volume;
providing an ejectable propulsion module to develop a lifting force for said space station core module and shuttle derived launch vehicle in addition to said at least one booster rocket;
providing an ejectable transition module between said propulsion module and said space station; and
lifting said space station core module by firing rockets on said ejectable propulsion module and said at least one booster rocket in a substantially simultaneous manner.

15. The method of claim 14, further comprising:
mounting said space station core module laterally with respect to said central fuel tank.

16. The method of claim 14, further comprising:
forming an aerodynamic fairing to cover said ejectable transition module.

17. The method of claim 14, further comprising:
providing a thrust structure within said ejectable transition section to transfer said lifting force from a non-cylindrical outer contour of said ejectable propulsion module to a cylindrical outer contour of said space station core module.

18. The method of claim 14, further comprising:
providing a central tunnel through said pressurized middle volume to interconnect compartments within said pressurized middle volume; and
providing hatches between said compartments within said pressurized middle volume to allow movement between said compartments without using said central tunnel.

19. The method of claim 18, further comprising:
forming said compartments within said pressurized middle volume using pressurized bulkheads, said hatches being disposed in said bulkheads to seal said compartments with respect to each other.

20. The method of claim 14, further comprising:
providing berthing tunnels interconnecting said pressurized middle volume for attaching international modules to said pressurized middle volume.

* * * * *